Dec. 8, 1931.  A. K. ASTER  1,835,743
SOUND PICTURE SYSTEM
Filed Aug. 14, 1929

INVENTOR
A. K. ASTER
BY
G. H. Heydt
ATTORNEY

Patented Dec. 8, 1931

1,835,743

UNITED STATES PATENT OFFICE

ALVIN K. ASTER, OF EAST ORANGE, NEW JERSEY, ASSIGNOR TO BELL TELEPHONE LABORATORIES, INCORPORATED, OF NEW YORK, N. Y., A CORPORATION OF NEW YORK

SOUND PICTURE SYSTEM

Application filed August 14, 1929. Serial No. 385,929.

This invention relates to motion picture films and particularly, to films having both pictures and a sound record.

The object of this invention is a method of producing a motion picture film having pictures of standard size, and having a second photographic record, which may be a sound record, so placed that the second record does not reduce the area available for the pictures.

A common method of adding a sound record to a motion picture film is to record the sound on the film on one side between the pictures and the perforations. The addition of the sound record reduces the area available for the pictures, and causes the picture on such a film to have a shape differing from the shape of the picture on a standard motion picture film. As a result, the picture on such a film will not cover the screen used for standard pictures.

It has been proposed to put the sound record on the film outside of the perforations, but it has been found that it is difficult to develop a photographic image which runs right to the edge of the film and that the film near the edge is liable to be fogged.

The present invention contemplates the provision of film stock wider than that normally used in present practice. The film stock is coated by well known methods, and then perforated with one row of perforations located as close to one edge as in the standard film. The second row of perforations is spaced at the normal distance laterally of the film, leaving a wide margin between the perforations and the edge of the film. A photographic record may be impressed on this margin close to the perforations and the record developed and finished. The surplus width is then cut off in any suitable slitting machine, reducing the film to standard width. Due to the wide margin on which the photographic record is impressed, edge effects are eliminated and the photographic image may be accurately developed.

In the drawings

Figure 1:
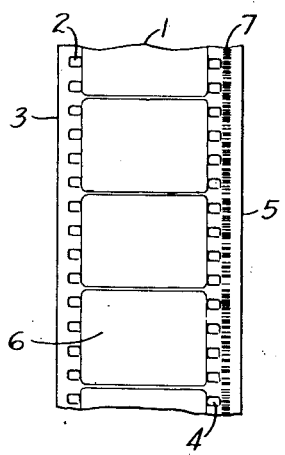
Fig. 1 represents the film after receiving the impression, developing and drying.

Motion picture film stock is commonly made in the form of a wide band which is coated with photosensitive material then slit into films of convenient width.

In accordance with this invention the coated film stock is slit into films wider than that normally used. The section of film 1 is perforated by a row of perforations 2 spaced the usual distance from the edge 3 of the film. A second row of perforations 4 is spaced the usual distance from the row 2, to leave a wide margin between the perforations 4 and the edge 5. The pictures 6 depicting the action are on the film in the usual location and of the same size as generally used for the action pictures on a silent picture film.

Figure 2:
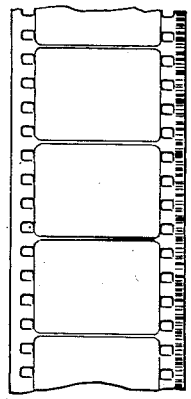
Fig. 2 represents the completed sound picture film.

On the wide margin between the perforations 4 and the margin 5 a photographic record 7 may be photographed or printed. For convenience a sound record of the constant width variable density type has been shown but any type of photographic record may be used. After the action pictures and sound record have been photographed or printed, the film is developed and dried by well known methods. The film is then placed in any suitable slitting machine and a portion of the wide margin cut off to reduce the film to the standard width film shown in Fig. 2, having action pictures of normal size in normal location on the film and a sound record along one edge outside the perforations. It will be obvious that this process is applicable to a negative film or to the positive print obtained from the negative film.

What is claimed is:

1. The method of making a multiple motion picture film which comprises perforating a photosensitive film of abnormal width with one row of sprocket holes normally spaced from one edge and a second row of sprocket holes normally spaced from said first row to leave a wide margin, impressing by photographic means action pictures on said film in normal location, impressing a photographic record on said margin adjacent said second row of sprocket holes, developing said film and triming said margin outside of said photographic record to reduce said film to normal width.

2. The method of making a sound picture film which comprises perforating a photosensitive film of abnormal width with one row of sprocket holes normally spaced from one edge and a second row of sprocket holes laterally spaced at normal distance from said first row to leave a wide margin outside said second row, printing action pictures in normal location on said film, printing a photographic sound record on said margin adjacent said second row of sprocket holes, developing said film, and trimming said margin outside of said sound record to reduce said film to normal width.

3. The method of making a sound picture film which comprises coating with photosensitive material a film stock of abnormal width perforating said stock with one row of sprocket holes normally spaced from one edge and a second row of sprocket holes normally spaced from said first row to leave an abnormally wide margin, printing action pictures on said film in normal location, printing a photographic sound record on said wide margin adjacent said second row of sprocket holes, develonig said film, and trimming said margin outside of said sound record to reduce said film to normal width.

4. The method of making sound picture films which comprises coating with photosensitive material a wide band of film stock, slitting said band to form a plurality of films of abnormal width, perforating said films with one row of sprocket holes normally spaced from one edge and a second row of sprocket holes laterally spaced at normal distance from said first row to leave a wide margin outside said second row, recording by photographic means action pictures in normal location on said films, impressing photographic sound records on said margins adjacent said second row of sprocket holes, developing said films, and trimming off said margins outside of said sound records to reduce said films to normal width.

In witness whereof, I hereunto subscribe my name this 12th day of August, 1929.

ALVIN K. ASTER.